US005416265A

United States Patent [19]

Shioda

[11] Patent Number: 5,416,265

[45] Date of Patent: May 16, 1995

[54] SOUND EFFECT-CREATING DEVICE

[75] Inventor: Kazuaki Shioda, Shizuoka, Japan

[73] Assignee: Kabushiki Kaisha Kawai Gakki Seisakusho, Shizuoka, Japan

[21] Appl. No.: 137,986

[22] Filed: Oct. 19, 1993

[30] Foreign Application Priority Data

Oct. 20, 1992 [JP] Japan .................................. 4-306344
Oct. 20, 1992 [JP] Japan .................................. 4-306345

[51] Int. Cl.$^6$ .............................................. G01H 7/00
[52] U.S. Cl. ..................................................... 84/645
[58] Field of Search .......................... 84/601, 609-614, 84/634-638, 645

[56] References Cited

U.S. PATENT DOCUMENTS 5,127,303 7/1992 Tsumura et al. ....................... 84/609
5,208,421 5/1993 Lisle et al. ............................ 84/845
5,262,585 11/1993 Greene et al. ........................ 84/645
5,286,907 2/1994 Okamura et al. ...................... 84/601
5,321,200 6/1994 Yamamoto ............................ 84/645

*Primary Examiner*—Vit W. Miska
*Attorney, Agent, or Firm*—Evenson, McKeown, Edwards & Lenahan

[57] ABSTRACT

A sound effect-creating device for imparting a sound effect to a musical tone produced by performance modulates an analog or digital signal indicative of the musical tone at a predetermined modulation frequency to impart a modulation (vibration) effect to the musical tone. The predetermined modulation frequency is set based on the repetition period of a timing clock of a MIDI signal received from an external electronic musical instrument. Alternatively, the repetition period of a timing clock of a MIDI signal transmitted to an external electronic musical instrument is determined based on a modulation parameter used in setting the predetermined modulation frequency.

9 Claims, 8 Drawing Sheets

SOUND EFFECT-CREATING DEVICE

BACKGROUND OF THE INVENTION

1. Field of the Invention

This invention relates to a sound effect-creating device used in electronic musical instruments and the like, and more particularly to a sound effect-creating device which is adapted to determine a predetermined modulation frequency (frequency of a modulating wave) based on a repetition period of a timing clock of a MIDI signal, or vice versa, in imparting a modulation effect to a musical tone.

2. Prior Art

In performance of a musical instrument or the singing of a song (hereinafter simply referred to as "the performance"), it is a known technique for making the performance sound natural to impart a modulation effect, such as a vibrato effect or a tremolo effect to elongated portions of the sustain sound. To make use of this technique, a sound effect-creating device comprising a modulator is generally used today, i.e., at the age of rapid progress in the art related to electronic musical instruments, thereby imparting the modulation effect to the performance.

In imparting the modulation effect to the performance by the use of such a sound effect-creating device, it is a conventional method that an operator of the sound effect-creating device determines a modulation frequency based on the operator's sense, or otherwise the operator calculates the modulation frequency based on the tempo of the performance, whenever it is required, or determines the modulation frequency by the use of a converting table set beforehand therefor, and then the operator sets the thus obtained modulation frequency to the modulator of the sound effect-creating device.

However, this method has the following inconveniences: First, it is naturally required to make the tempo of performance of an electronic musical instrument playing an accompaniment completely synchronous with the modulation frequency for modulating the musical tone signal of the performance. Otherwise, the vibration of the musical tone caused by the modulation does not agree with the accompaniment, and impedes the performance to the contrary. According to the conventional method, the modulation frequency of the sound effect-creating device for modulating the musical tone signal is set by the operator separately from or independently of the electronic musical instrument for the accompaniment, which prevents the tempo of the accompaniment of the electronic musical instrument from being completely synchronous with the modulation frequency for modulating the musical tone signal and hence with the resulting vibration (vibrato or tremolo) of the musical tone. Furthermore, if the tempo of the performance or the accompaniment is changed during the performance, it is impossible to change setting of the modulation frequency, since this will impede progress of the performance.

Secondly, such calculation or use of the converting table in determining the modulation frequency is not preferred, since it is not only troublesome but also unbecoming to the performance of music which should be based on sensitivity by nature.

SUMMARY OF THE INVENTION

It is a first object of the invention to provide a sound effect-creating device which is capable of automatically modulating a signal indicative of a musical tone by a modulation frequency corresponding to the tempo of an electronic musical instrument connected thereto to thereby impart an excellent modulation effect to the performance.

It is a second object of the invention to provide a sound effect-creating device which is capable of determining the tempo of performance of an electronic musical instrument connected thereto in a manner corresponding to a modulation frequency for modulating a signal indicative of a musical tone.

To attain the first object of the invention, according to a first aspect of the invention, there is provided a sound effect-creating device for imparting a sound effect to a musical tone produced by performance, including modulation means for modulating an analog or digital signal indicative of the musical tone at a predetermined modulation frequency to thereby impart a predetermined modulation effect to the musical tone.

The sound effect-creating device according to the first aspect of the invention is characterized by comprising:

MIDI signal-receiving means connected to an electronic musical instrument for receiving a MIDI signal therefrom;

clock period-calculating means for calculating a period of a timing clock of the MIDI signal received by the MIDI signal-receiving means; and modulation frequency-setting means for setting the predetermined modulation frequency based on the period of the timing clock of the MIDI signal calculated by the clock period-calculating means.

According to the sound effect-creating device of the first aspect of the invention, the predetermined modulation frequency is determined based on the period of the timing clock of the MIDI signal received from the electronic musical instrument. Therefore, it is possible to impart an excellent modulation effect to the performance while making the tempo of performance of the electronic musical instrument coincident with the modulation frequency of the musical tone signal.

Preferably, the sound effect-creating device further includes tempo determining means for determining a tempo of performance of the electronic musical instrument based on the period of the timing clock of the MIDI signal calculated by the clock period-calculating means, and the modulation frequency-setting means sets the predetermined modulation frequency based on the tempo determined by the tempo determining means.

Further preferably, the modulation frequency-setting means includes meter setting means for setting a parameter indicative of a meter of the musical tone, and sets the predetermined modulation frequency depending on the parameter indicative of the meter of the musical tone.

According to this preferred embodiment of the invention, it is possible to change the modulation frequency alone without changing the tempo of the performance calculated based on the period of the timing clock of the MIDI signal. Therefore, if the meter of performance of the electronic musical instrument is not synchronous with that of the musical tone while the tempo of the former is identical to that of the latter, it is possible to change the modulation frequency such that vibration (vibrato or tremolo) is added to the musical tone in a manner coincident not only with the tempo bust also with the meter of the performance of the electronic musical instrument.

To attain the second object of the invention, according to a second aspect of the invention, there is provided a sound effect-creating device for imparting a sound effect to a musical tone produced by performance, including modulation means for modulating an analog or digital signal indicative of a musical tone at a predetermined modulation frequency to thereby impart a predetermined modulation effect to the musical tone.

The sound effect-creating device according to the second aspect of the invention is characterized by comprising:

- modulation parameter-setting means for setting a modulation parameter for use in setting the predetermined modulation frequency;
- MIDI signal-delivering means for delivering a MIDI signal for control of an electronic musical instrument; and
- timing setting means for setting a period of a timing clock of the MIDI signal based on the modulation parameter set by the modulation parameter-setting means.

According to the sound effect-creating device of the second aspect of the invention, the period of the timing clock of the MIDI signal transmitted to the electronic musical instrument is determined based on the modulation parameter set by the modulation parameter-setting means. Therefore, it is possible to make the tempo of performance of the electronic musical instrument completely coincident with the modulation frequency of the musical tone signal, to thereby impart an excellent modulation effect to the performance.

Preferably, the modulation parameter-setting means includes basic modulation frequency-setting means for setting, as the modulation parameter, a parameter indicative of a basic modulation frequency corresponding to a particular note for use in setting the predetermined modulation frequency, and the timing setting means sets the period of the timing clock of the MIDI signal based on the parameter indicative of the basic modulation frequency set by the basic modulation frequency-setting means.

Alternatively or in combination, the modulation parameter-setting means includes tempo setting means for setting, as the modulation parameter, the tempo of performance of the musical tone, a tempo being in a predetermined relationship with a basic modulation frequency corresponding to a particular note for use in setting the predetermined modulation frequency, and the timing setting means sets the period of the timing clock of the MIDI signal based on the tempo set by the tempo setting means.

Further preferably, the sound effect-creating device includes meter-setting means for setting a parameter indicative of a meter of the musical tone, and modulation frequency-setting means for setting the predetermined modulation frequency based on the basic modulation frequency depending on the parameter indicative of the meter of the musical tone.

According to this preferred embodiment of the invention, it is possible to change the modulation frequency alone without changing the period of the timing clock of the MIDI signal. Therefore, if the meter of performance of the electronic musical instrument is not synchronous with that of the musical tone while the tempo of the former is identical to that of the latter, it is possible to change the modulation frequency for modulating the musical tone signal such that the meter of the musical tone becomes coincident with that of performance of the electronic musical instrument.

The above and other objects, features, and advantages of the invention will become more apparent from the ensuing detailed description taken in conjunction with the accompanying drawings.

DETAILED DESCRIPTION

The invention will now be described in detail with reference to the drawings showing preferred embodiments thereof.

Figure 1A:
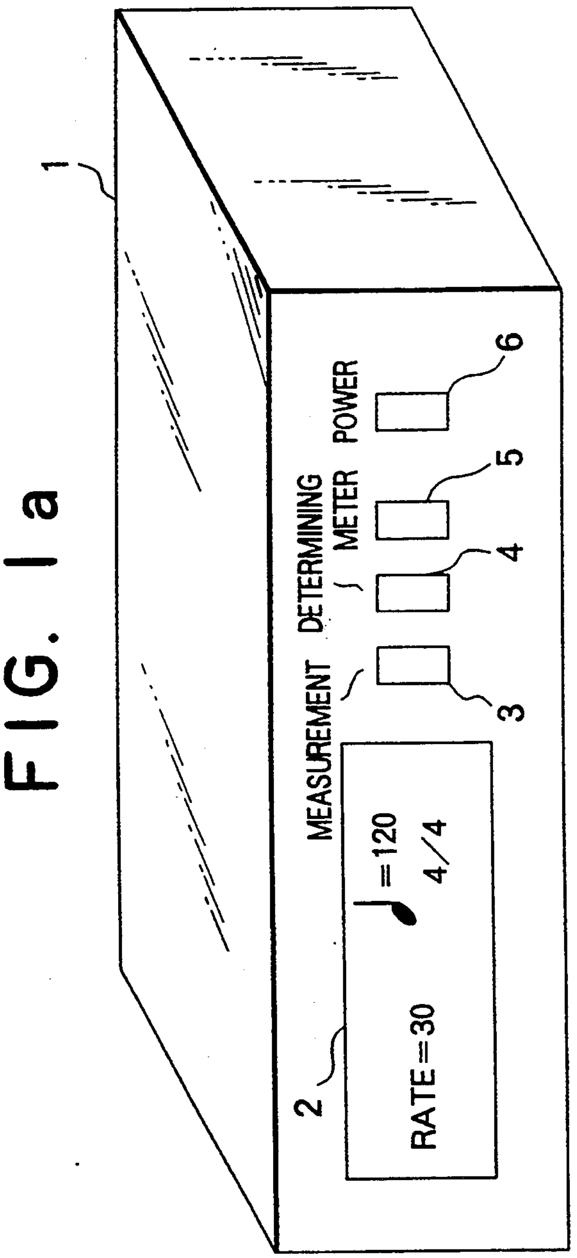
FIG. 1*a* is a diagram showing an appearance (front) of a sound effect-creating device according to a first embodiment of the invention.
Figure 1B:
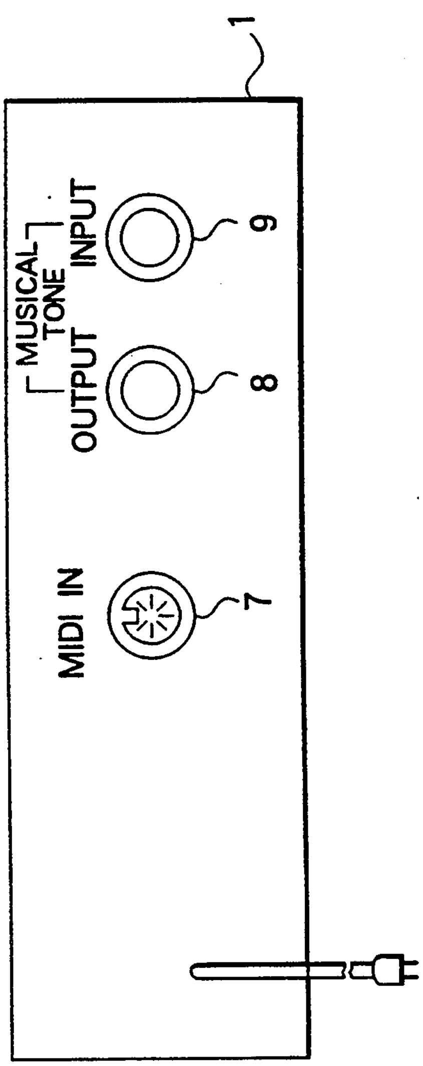
FIG. 1*b* is a diagram showing an appearance (rear) of the sound effect-creating device according to the first embodiment.

First, the construction of a sound effect-creating device according to a first embodiment of the invention will be described with reference to FIG. 1*a*, FIG. 1*b* and FIG. 2. FIG. 1*a* and FIG. 1*b* shows appearances of the sound effect-creating device 1. On the front of the sound effect-creating device shown in FIG. 1*a*, there are arranged a display 2, a measurement switch 3, a determining switch 4, a meter setting switch 5, and a power switch 6. On the rear of same shown in FIG. 1*b*, there are arranged a MIDI signal connector 7, a musical tone output connector 8, and a musical tone input connector 9.

The display 2 is formed of liquid crystal, and displays a modulation rate of a modulation wave for modulating the musical tone signal indicative of a voice and/or a musical tone produced by an electronic musical instrument and the like, a tempo of performance of an external electronic musical instrument for accompaniment, which is calculated based on a timing clock of a MIDI signal received therefrom, and a meter for changing or setting a modulation frequency based on the modulation rate. In the present specification, the term "modulation rate" is defined as "a parameter indicative of a basic modulation frequency, which is represented by a value obtained by dividing a value of the tempo by 4". This value of the modulation rate is indicated on the display 2.

The measurement switch 3 and the determining switch 4 are both of a push-button type. When the measurement switch 3 is depressed, a modulation rate-calculating routine for calculating the modulation rate based on the timing clock of the MIDI signal is slatted. When the determining switch 4 is depressed, a main routine for modulating the musical tone signal at a predetermined modulation frequency is started. These routines will be described in detail hereinbelow.

The meter setting switch 5 is operated to input or set a parameter indicative of a meter of the musical tone the signal of which is to be modulated, to the sound effect-creating device 1. When the meter setting switch 5 is operated, a meter is displayed on the display 2, and the modulation frequency is set based on the modulation rate (indicative of the basic modulation frequency) and in a manner corresponding to the parameter set by the switch 5. Therefore, it is possible to change the modulation frequency for modulating the musical tone signal such that it suits a desired meter without changing the tempo or speed of performance calculated from the timing clock of the MIDI signal. A manner of determining the modulation frequency depending on the meter will be described in detail hereinbelow when the modulating routine is described with reference to FIG. 6. When the meter setting switch 5 is not operated, no meter is displayed on the display 2, and the modulation frequency is set to the basic modulation frequency. The power switch 6 is also of a push-button type. When the power switch 6 is depressed, the power starts to be supplied to the sound effect-creating device 1.

The MIDI signal connector 7 receives a MIDI signal for timing clock-based synchronous control of electronic musical instruments meeting the MIDI standard requirements, which employ a sequencer or a computer. A signal of the timing clock from the external electronic musical instrument is received via the MIDI signal connector 7.

The musical tone output connector 8 and the musical tone input connector 9 are provided for receiving and outputting the signal indicative of the musical tone, respectively. The musical tone output connector 8 is connected to an audio amplifier, not shown, while the musical tone input connector 9 is connected to a microphone, an electronic musical instrument other than the aforementioned external musical instrument, or the like, neither of which is shown.

Then, referring to FIG. 2, there will be described the whole arrangement of the sound effect-creating device 1 which is common to the first and second embodiments of the invention. As shown in FIG. 2, the sound effect-creating device 1 comprises a CPU 11, an analog-to-digital (A/D) converter 12, a digital-to-analog (D/A) converter 13, a switch interfade 14, a display interface 15, a program ROM 16, a RAM 17, a MIDI block 18, a delay RAM 19, and a system bus 20.

More specifically, the CPU 11 is formed by a microcomputer, and controls various operations of the sound effect-creating device 1 including a musical tone signal-modulating operation, a modulation frequency-setting operation, and reception of data of the MIDI signal. The A/D converter 12 converts an analog signal indicative of the musical tone into a digital signal. The D/A converter 13 converts the digital signal into the analog signal. The switch interface 14 delivers ON/-OFF signals set by the switches 3, 4, and 5 to the CPU 11. The display interface 15 converts data of the modulation rate, etc. read from the CPU 11 into data for display and supplies the resulting data to the display 2.

The program ROM 16 stores programs for operating the CPU 11. The RAM 17 temporarily stores therein data of values of the modulation rate and the tempo as results of calculation by the CPU 11, etc. The MIDI block 18 converts serial data of the timing clock of the MIDI signal received from the external electronic musical instrument via the MIDI signal connector 7 into a signal receivable by the CPU 11. The delay RAM 19 temporarily stores data of a digital signal of the musical tone. The delay RAM 19 is not particularly limited, but it may contain a memory area formed by an address 0000 to an address FFFF, each of which address can store three bytes of data of the digital signal.

Next, a manner of use of the sound effect-creating device 1 will be briefly described. When a modulation effect is to be imparted to the performance, the microphone is connected to the musical tone input connector 9 to thereby input a signal of a musical tone to the sound effect-creating device 1. The musical tone output connector 8 is connected to the audio amplifier and an output block thereof is connected to the loudspeaker. Further, the MIDI signal connector 7 is connected to the external electronic musical instrument.

When the MIDI signal is received from the external electronic musical instrument, and the measurement switch 3 is depressed, measurement of a period (repetition period) of the timing clock of the MIDI signal and calculation of the modulation rate and the tempo from the measured period are started. During measurement, both the indications of the modulation rate and the tempo on the display 2 flicker. When the indicated values of the modulation rate and the tempo become stable or constant, the determining switch 4 is depressed, and accordingly the indications of the modulation rate and the tempo cease to flicker to be put into fixedly lighted states. At the same time, the signal indicative of the musical tone input via the musical tone input connector is modulated based on the modulation rate indicated on the display 2, and then delivered from the musical tone output connector 8.

The modulation rate normally corresponds to a modulation period corresponding to one whole note, and when the meter setting switch 5 is not operated, the musical tone signal is modulated at this modulation period (i.e. at the basic modulation frequency), If a modulation corresponding to a desired number of a desired kind of notes, i.e. a modulation corresponding to a desired meter, is to be effected, the modulation frequency may be set or changed by operating the meter setting switch 5, as will be described hereinafter.

Thus, the signal indicative of the musical tone input to the sound effect-creating device 1 is delivered to the audio amplifier from the musical tone output connector 8 after modulation of the musical tone signal by the modulation wave set based on the modulation rate, which enables a modulation effect to be imparted to the performance.

In addition, when the tempo of performance of the external electronic musical instrument for accompaniment is changed during the performance, the period of the timing clock of the MIDI signal is simultaneously changed. Therefore, the sound effect-creating device constantly measures the period of the timing clock, and the modulation rate and the tempo indicated on the display 2 as well as the modulation frequency for modulating the musical tone signal are changed in a manner corresponding to the period of the timing clock.

Next, the operation of the sound effect-creating device 1 will be described in detail with reference to FIG. 3 to FIG. 5.

Figure 3:
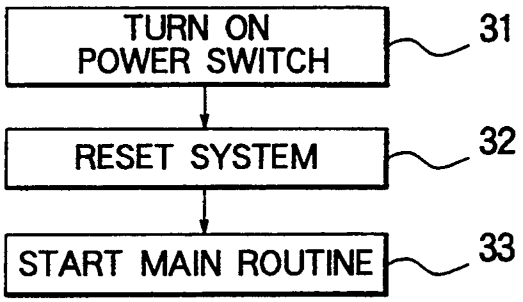
FIG. 3 is a flowchart of a starting routine for starting the sound effect-creating device according to the first and second embodiments.

FIG. 3 shows a starting routine for starting the sound effect-creating device 1. First, when the power switch 6 is turned on, a predetermined power starts to be supplied to the sound effect-creating device 1 at a step 31. The CPU 11 resets the system in a predetermined manner according to a program stored in the program ROM 16 at a step 32, and then starts a main routine or a program shown in FIG. 4 for modulating a musical tone signal, at a step 33.

The FIG. 4 main routine is carried out in the following manner:

The CPU 11 constantly monitors an ON/OFF signal supplied via the switch interface 14 from the determining switch 4 at a step 34. When the determining switch 4 is depressed, the CPU 11 stores data of the modulation rate calculated by a modulation rate-calculating routine, described hereinafter, into the RAM 17, at a step 35.

Then, the analog signal of the musical tone is converted into the digital signal by the A/D converter 12, and data of the digital signal (hereinafter referred to as "the data") is written into the delay RAM 19 via the system bus 20 at a step 36. Storing of the data into the delay RAM 19 is carried out in the following manner: First, a data item is written into an address 0000 of the delay RAM 19. Then, in the following loop, i.e. after execution of the main routine once, the data item stored in the address 0000 is moved into the next address 0001, and then the following data item is written into the address 0000. Such a procedure is repeatedly carried out for all the following items of the data whenever the main routine is executed, whereby the first data item stored is sequentially moved from the address 0000 toward the address FFFF, and all the following data items are stored in a predetermined address area having a predetermine sequence of the addresses from 0000 to FFFF at a step 36.

Then, at a step 37, data of one of read addresses, which is determined at the modulating routine, described hereinafter, and stored into the RAM 17, is read from the RAM 17, and a data item of the musical tone is read from one of the read addresses of the delay RAM 19 alternately selected at intervals of half of a time period Ta at a step 38. The read addresses and the time period Ta will be described in detail in description of the modulating routine. The data of the musical tone read out from the delay RAM 19 is delivered to the D/A converter 13 at a step 39.

The modulation rate-calculating routine will now be described with reference to FIG. 5. According to this routine, the tempo of performance of the external electronic musical instrument and the modulation rate, which is a parameter indicative of the basic modulation frequency for modulating the musical tone, are determined based on the period of the timing clock of the MIDI signal. More specifically, this routine is carried out in the following manner: The CPU 11 constantly monitors the ON/OFF signal supplied from the measurement switch 3 via the switch interface 14 at a step 41. When the measurement switch 3 is depressed, i.e. when the ON signal is detected, the CPU 11 sets Tb to 0 at a step 42. The symbol Tb designates a variable for measuring the period of the timing clock of the MIDI signal, which is not particularly limited, and set in the present embodiment such that a value of Tb=1 corresponds to a time period of 20.8 μsec.

The CPU 11 constantly checks for whether the MIDI signal is supplied thereto via the MIDI block 18 at a step 43. The value of Tb is increased by an increment of 1 at a step 44 if no MIDI signal is received, and these steps 43 and 44 are repeatedly carried out so long as no MIDI signal is received. If the MIDI signal is received, a value of Tb assumed then is read at a step 45, and the value of Tb is multiplied by a unit time period of 20.8 μsec. with the resulting product being set to the period of the timing clock of the MIDI signal. Then, the tempo is calculated at a step 46.

Now, the calculation of the tempo will be described assuming that the value of Tb is 1000, i.e. the period of the timing clock is equal to 20.8 μsec.=1000=20.8 msec. More specifically, according to the MIDI standard, the timing clock (F8H) is defined as the system real time message. According to the definition, twenty-four timing clocks are transmitted per one quarter note. The tempo is defined as the number of quarter notes counted per one minute. In the present case, since the period of the timing clock is assumed to be 20.8 msec., the number of timing clocks per one minute is approximately 2880. Therefore, the tempo, which is the number of quarter notes (one quarter note corresponding to 24 timing clocks), can be calculated by dividing the number of timing clocks counted per minute by 24. The thus obtained value of the tempo, i.e. the resulting quotient, is approximately 120.

Then, the modulation rate is calculated from the thus obtained value of the tempo at a step 47. A value of the modulation rate is, as defined hereinbefore, equal to a value obtained by dividing a value of tempo by 4. On the other hand, the tempo is the number of quarter notes counted per one minute, and hence the value of the modulation rate is equal to the number of whole notes per one minute. In the above-mentioned example, the modulation rate assumes a value of 30 (/min.). Further, in the present embodiment, a reference modulation frequency (basic modulation frequency) which serves as basis in determining the modulation frequency for modulating the musical tone is set such that the basic modulation frequency is equivalent to the modulation rate. Therefore, in the above example, according to the basic modulation frequency indicated by the value of the modulation rate, a modulation wave for modulating the musical tone signal has 30 waves per one minute. In short, the basic modulation frequency is set to 0.5 Hz.

Data of the tempo and the modulation rate calculated as above is stored into the RAM 17 and converted into data for display, which in turn is supplied via the display interface 15 to the display 2 to be displayed thereon at a step 48, followed by the program returning to the step 42 to repeatedly carry out the modulation rate-calculating routine.

In this connection, after the determining switch has been depressed, if the period of the timing clock of the MIDI signal is changed, the modulation rate-calculating routine is carried out and then the main routine is automatically executed, to thereby automatically change the modulation rate and the tempo as well as indications thereof on the display, and also the modulation frequency dependent on the modulation rate.

In addition, although, in the present embodiment, the tempo of the performance of the external electronic musical instrument is calculated from the period of the timing clock supplied therefrom, and based on a value of the tempo, the modulation rate is calculated, this is not limitative, but since the relationship of the period of the timing clock, the tempo, and the modulation rate is invariably determined, it goes without saying that the modulation rate can be directly calculated from the period of the timing clock.

Figure 6:
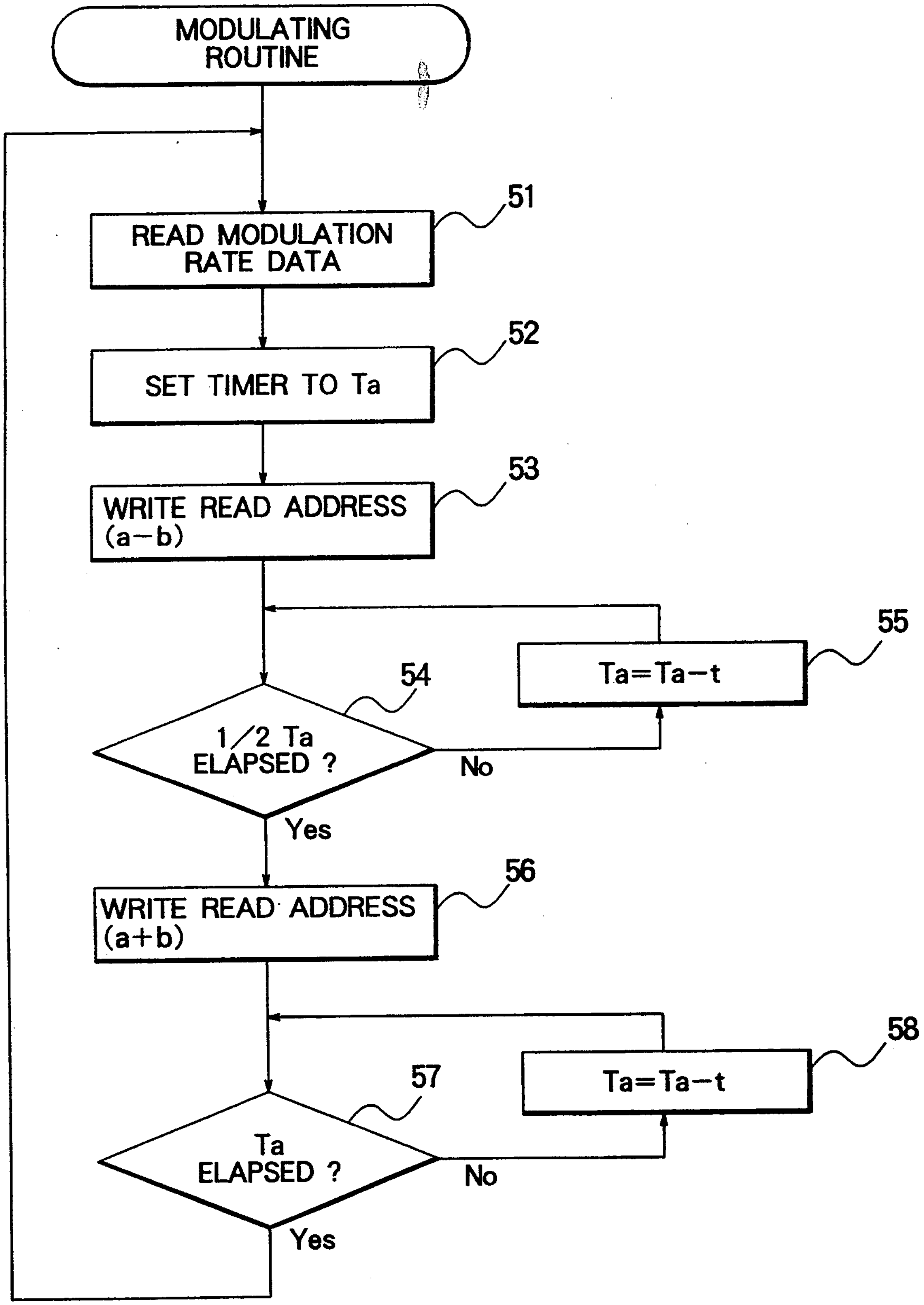
FIG. 6 is a flowchart of a modulating routine which is executed by the first and second embodiments.

Next, the modulating routine will be described with reference to FIG. 6. According to this program, the read addresses mentioned in the above main routine and an interval for changing one reading address to the other or vice versa are determined, to thereby determine a degree of modulation and the modulation frequency. In the present embodiment, description will be made as to a case of frequency modulation. First, the data of the modulation rate determined by the modulation rate-calculating routine and stored into the RAM 17 is read therefrom at a step 51, and a time period Ta corresponding to the modulation rate (i.e. the modulation period Ta, which is equal to 2 seconds in the above example) is calculated and set to a timer at a step 52. Then, data of a value of (a−b) indicative of one read address is written into the RAM 17 at a step 53. Here, the symbol "a" represents a value (variable) which is at least larger than a value of "b" which indicates a distance between two addresses of the delay RAM 19 alternately selected for reading out data therefrom. Although the degree of modulation may increase or decrease in a manner proportional to an increase or decrease of the distance value "b", the distance value is fixed in the present embodiment. It goes without saying that the distance value can be provided as a variable value which may be changed by operating a switch, a volume knob, or the like provided therefor.

Then, it is checked for at a step 54 whenever a predetermined time period elapses whether or not a predetermined reference value corresponding to the modulation period Ta set to the timer has been counted down to a value corresponding to half ($\frac{1}{2}$) of the modulation period Ta. If the former has not been counted down to the latter, i.e. if the time period $\frac{1}{2}$ Ta has not elapsed, a value corresponding to a predetermined time period "t" is subtracted from the count value of the timer at a step 55, and the steps 54 and 55 are repeatedly carried out until the time period $\frac{1}{2}$ Ta has elapsed. When the time period $\frac{1}{2}$ Ta has elapsed, the data of the read address stored in the RAM 17 is updated to data of a value of (a+b) at a step 56. Thereafter, it is checked for at a step 57 whenever the predetermined time period elapses whether or not the predetermined reference value corresponding to the modulation period Ta set to the timer has been counted down to a value of 0. If the former has not been counted down to the latter, i.e. if the time period Ta has not elapsed, the value corresponding to the predetermined time period "t" is subtracted from the count value of the timer at a step 58, and the steps 57 and 58 are repeatedly carried out until the time period Ta has elapsed. When the time period Ta has elapsed, one cycle of the modulating routine is completed, and then another cycle thereof starts to be repeatedly carried out. By reading data stored in the read addresses (a−b) and (a+b) alternately selected whenever half the modulation period Ta has elapsed, over each interval of $\frac{1}{2}$ Ta from the delay RAM 19 according to the main routine described above, the modulation of the musical tone signal based on the modulation rate (at the basic modulation frequency) is performed.

The time period Ta determined by this modulating routine corresponds to the modulation rate (and hence the basic modulation frequency) defined in this specification if the meter setting switch 5 has not been operated, as described hereinabove, and designates a modulation period (repetition period of a modulating wave) .corresponding to one whole tone assumed at the tempo calculated by the FIG. 5 modulation rate-calculating routine. When the modulation period (and hence the modulation frequency) is to be determined in a manner suitable for the meter of the musical tone, a time period Ta is determined according to the meter set by the meter setting switch 5 in the following manner: A reference value of 1 is assigned to one whole note, while reference values of 0.5, 0.25, 0.125 and 0.0625 are assigned to one half note, one quarter note, one eighth note, and one sixteenth note, respectively. The time period Ta is multiplied by the product of selected one of these reference values and the number of beat of the meter to obtain the time period Ta' suitable for the meter, and then the musical tone data is read out from one of the read addresses which is alternately selected whenever half the time period Ta' elapses, which makes it possible to modulate the musical tone signal at the modulation frequency in a manner corresponding to the meter of the performance or the musical tone. For example, if the musical tone signal is to be modulated by a repetition period corresponding to two quarter notes (i.e. half whole note) in a manner coincident with two-four meter, $Ta'=0.25\times2\ \times Ta=0.5\times Ta$. In addition, in the case of modulation based on notes of a kind others than the above-mentioned ones, a reference value of one note of this kind is determined in a manner proportional to duration of one note of this kind.

As described heretofore, according to the present embodiment, the modulation rate is calculated based on the period of the timing clock of the MIDI signal, and the modulation frequency for modulating the musical tone signal is determined based on the modulation rate thus obtained, and further depending on the meter of the performance of the instrument, if required. Therefore, the modulation frequency can be made completely synchronous not only with the tempo of the performance of the electronic musical instrument for accompaniment but also with the meter thereof. Therefore, an excellent modulation effect can be imparted to the musical tone.

Next, the second embodiment of the invention will be described with reference to FIG. 7*a*, FIG. 71*b*, FIG. 2, and FIG. 8 to FIG. 11.

This embodiment is distinguished from the first embodiment in that the modulation rate (and hence the modulation frequency) is not determined based on the period of the timing clock of the MIDI signal received from the external electronic musical instrument, but conversely, the period of the timing clock of the MIDI signal transmitted to the external electronic instrument is determined based on the modulation rate (and hence the modulation frequency) set by the operator. In the following description and related figures, elements and components identical or similar to those of the first embodiment are designated by identical reference numerals, and detailed description thereof is omitted.

Figure 7A:
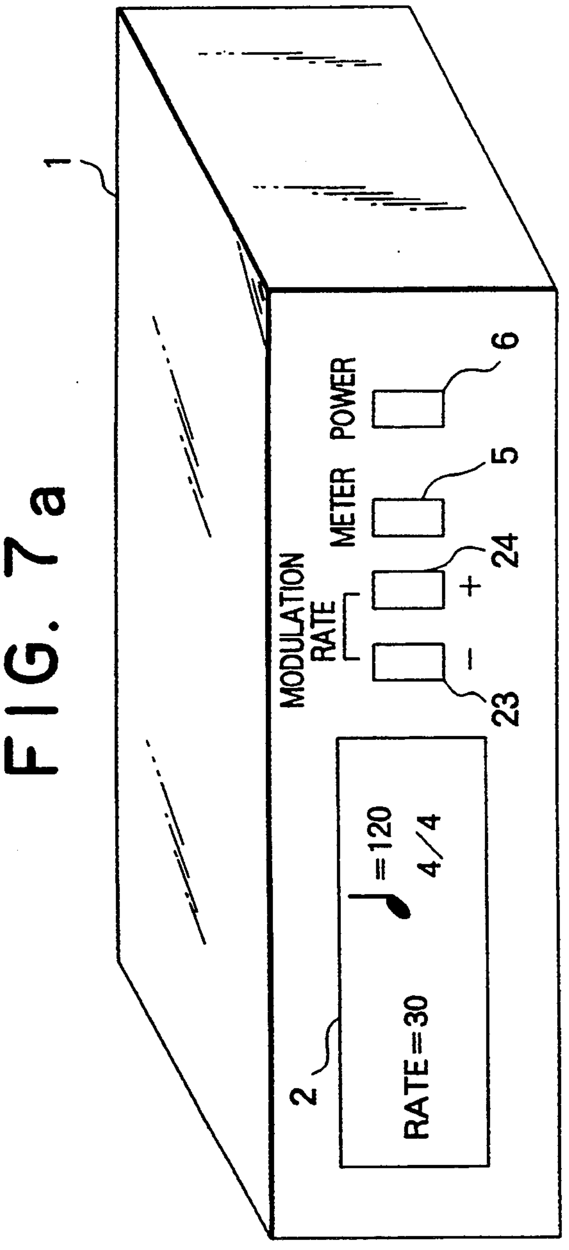
FIG. 7*a* is a diagram showing an appearance (front) of a sound effect-creating device according to the second embodiment.

FIG. 7*a* shows an appearance (front) of the sound effect-creating device according to the second embodiment of the invention. In the figure, reference numerals 23, 24 designate push-button switches for setting the modulation rate (the basic modulation frequency) and the tempo. More specifically, when the switch 23 is depressed, a value of the modulation rate indicated on the display 2 is decreased (the basic modulation frequency for modulating the musical tone signal is set to a lower value). At the same time, a value of the tempo indicated on the display 2 decreases as the modulation rate decreases. Conversely, when the switch 24 is depressed, the modulation rate indicated on the display 2 is increased (the basic modulation frequency is set to a higher value), with the tempo indicated on the display 2 being set to a larger value accordingly.

Figure 7B:
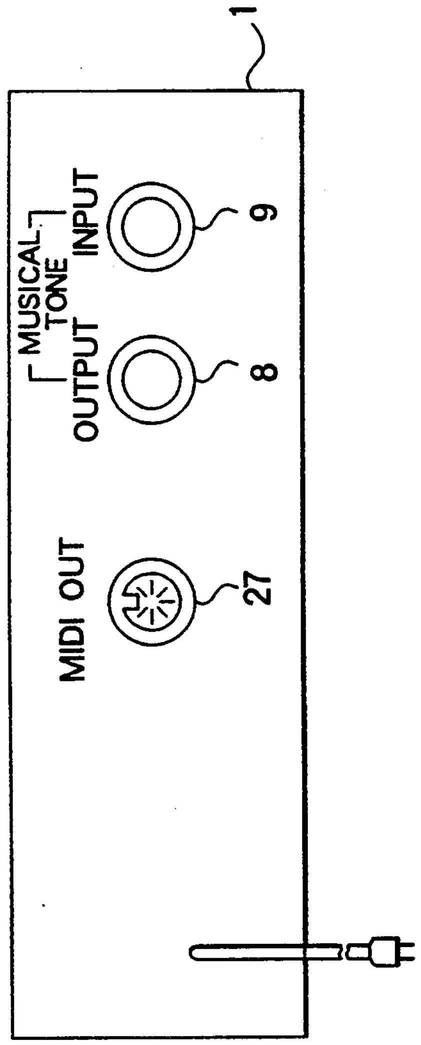
FIG. 7*b* is a diagram showing an appearance (rear) of the sound effect-creating device according to the second embodiment.

FIG. 7*b* shows an appearance (rear) of the sound effect-creating device 1 of the second embodiment. In the figure, the MIDI signal connector 27 is a connector from which is transmitted the MIDI signal to an electronic musical instrument conforming to the MIDI standard in which a sequencer or a computer is used, for synchronous control thereof. A signal of the timing clock is delivered via the MIDI signal connector 27 to the electronic musical instrument.

Figure 2:
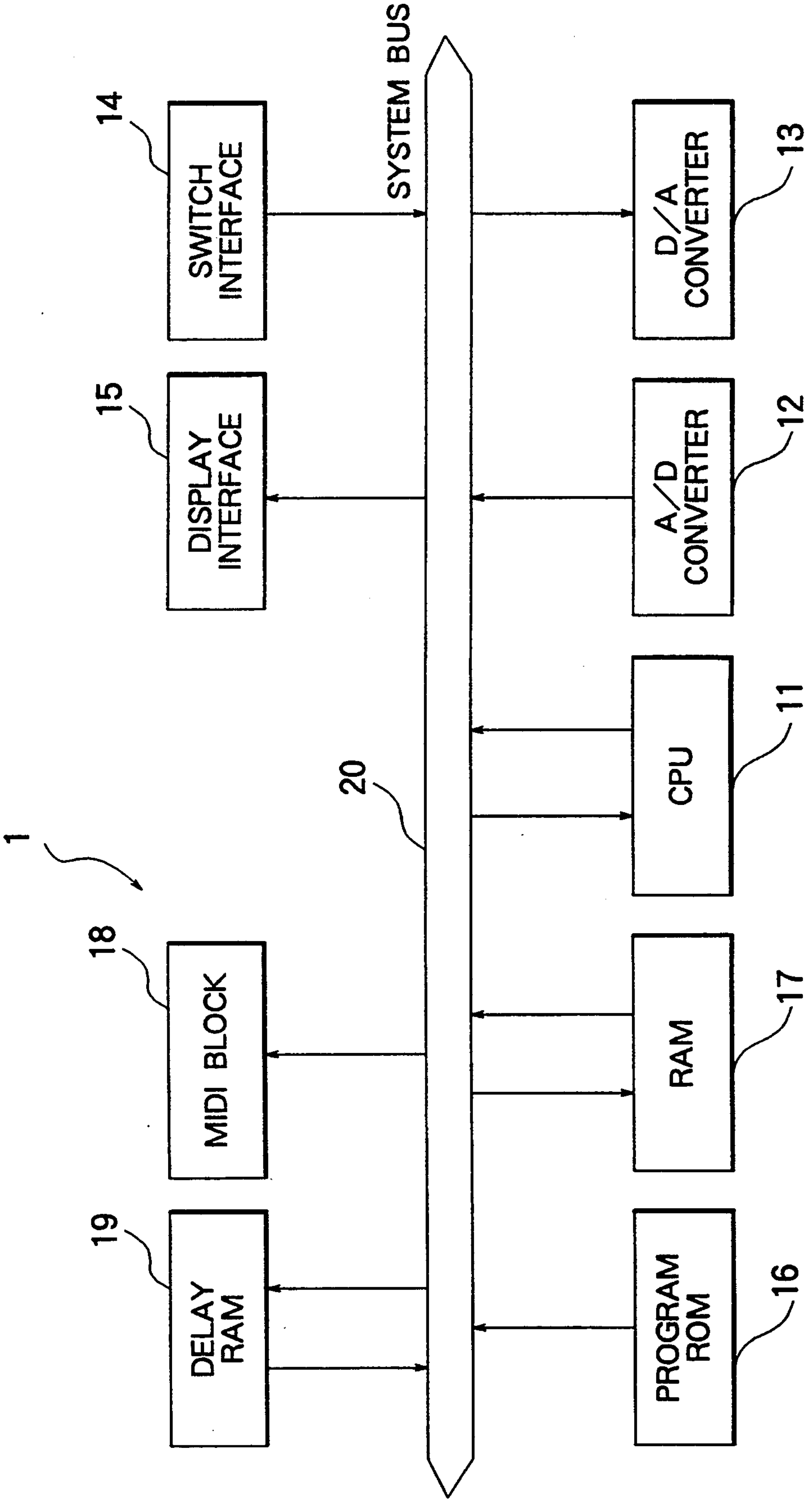
FIG. 2 is a block diagram showing the whole arrangement of the sound effect creating device which is common to the first embodiment and a second embodiment of the invention.

The arrangement of the sound effect-creating device of the second embodiment is similar to that of the first embodiment shown in FIG. 2. In the present embodiment, the CPU 11 controls various operations of the sound effect-creating device i including the modulation of the musical tone signal and preparation of the MIDI signal data. ON/OFF signals generated by the switches 23, 24, and 5 are transmitted via the switch interface 14 to the CPU 11.

The RAM 17 temporarily stores results of calculation by the CPU 11, values of the modulation rate and the tempo set by the operator, etc. The MIDI block 18 converts the signal of the timing clock delivered from the CPU 11 into a predetermined serial data signal so as to transmit the MIDI signal via the MIDI signal connector 27 to the external electronic musical instrument.

The sound effect-creating device according to the second embodiment is used in the following manner: The device is connected to external devices or systems, similarly to the first embodiment. Then, the modulation rate is set as desired by operating the switches 23 and/or 24. Accordingly, the modulation rate and the tempo of the performance corresponding thereto are indicated on the display 2.

In this connection, normally, the modulation rate corresponds to a modulation period corresponding to one whole note, and the modulation of the musical tone signal is performed at the basic modulation frequency corresponding to the modulation rate (i.e. the basic modulation frequency is set to the modulation frequency without change), if the meter setting switch 5 has not been operated. The modulation frequency can be set or changed, if desired, by the use of the meters setting switch 5, depending on the conditions of the performance, i.e. depending on the meter of the performance, as described hereinabove with the first embodiment.

By the above settings, the signal indicative of the musical tone input to the sound effect-creating device 1 is delivered from the connector 8 to the audio amplifier after being modulated by a modulating wave set based on the modulation rate (i.e. the basic modulation frequency), and then supplied to a loudspeaker, which converts the modulated musical tone signal into the musical tone having been imparted with the vibration effect (i.e. vibrato effect or tremolo effect).

Further, the timing clock corresponding to the modulation rate set as above is transmitted from the MIDI signal connector 27. Therefore, the electronic musical instrument is played in synchronism with the timing clock supplied thereto, which makes it possible to make the modulation of the musical tone signal and the tempo of performance of the electronic musical instrument for accompaniment completely synchronous with each other, and hence to impart an excellent modulation effect (i.e. vibration effect) to the performance.

When the modulation frequency is to be changed, the switch 23 or 24 is depressed to automatically change the modulation rate and hence an indication thereof on the display 2, as well as the modulation frequency for modulating the musical tone signal. In this connection, since the tempo is also set by the switch 23 or 24, it is possible to determine the modulation frequency for modulating the musical tone signal and the tempo of performance of the electronic musical instrument for accompaniment through setting of the tempo. Further, when the meter is set by operating the switch 5, the modulation frequency is changed or determined to a value suitable for the meter, which makes it possible to change the modulation frequency alone without changing the period of the timing clock of the MIDI signal. In this case, the meter is indicated on the display 2.

Next, the operation of the sound effect-creating device 1 will be described in detail with reference to FIG. 8 to FIG. 11. The device 1 is started according to the starting routine described hereinabove in the first embodiment with reference to FIG. 3.

Figure 8:
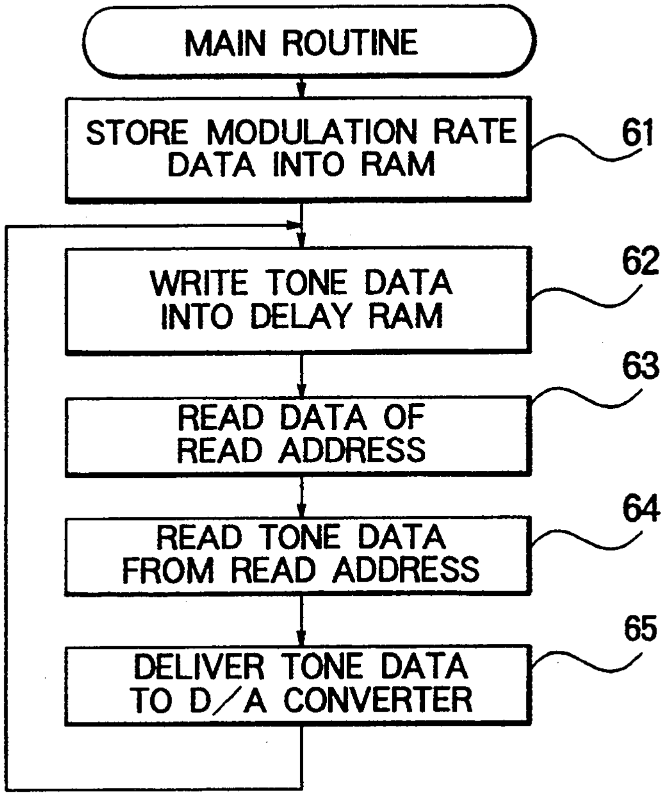
FIG. 8 is a flowchart of a main routine for controlling the operation of the sound effect-creating device according to the second embodiment.

Next, a main routine carried out by the sound effect-creating device 1 of the second embodiment will be described with reference to FIG. 8. The CPU reads data of initial settings to the device 1 stored in the RAM 17 when the power switch 6 is turned on, and indicates them on the display 2. When the switch 23 or 24 is depressed for setting a desired modulation rate, the CPU 11 receives data on the ON/OFF state of the switch 23 or 24 via the switch interface 14, and sets and indicates the modulation rate to a smaller or larger value in a manner proportional to duration of the ON state of the switch 23 or 24. Further, the tempo corresponding to the modulation rate is also determined and indicated on the display 2. While the indications based the above settings are carried out, the CPU stores the data of the modulation rate and the tempo into the RAM 17 at a step 61.

Figure 4:
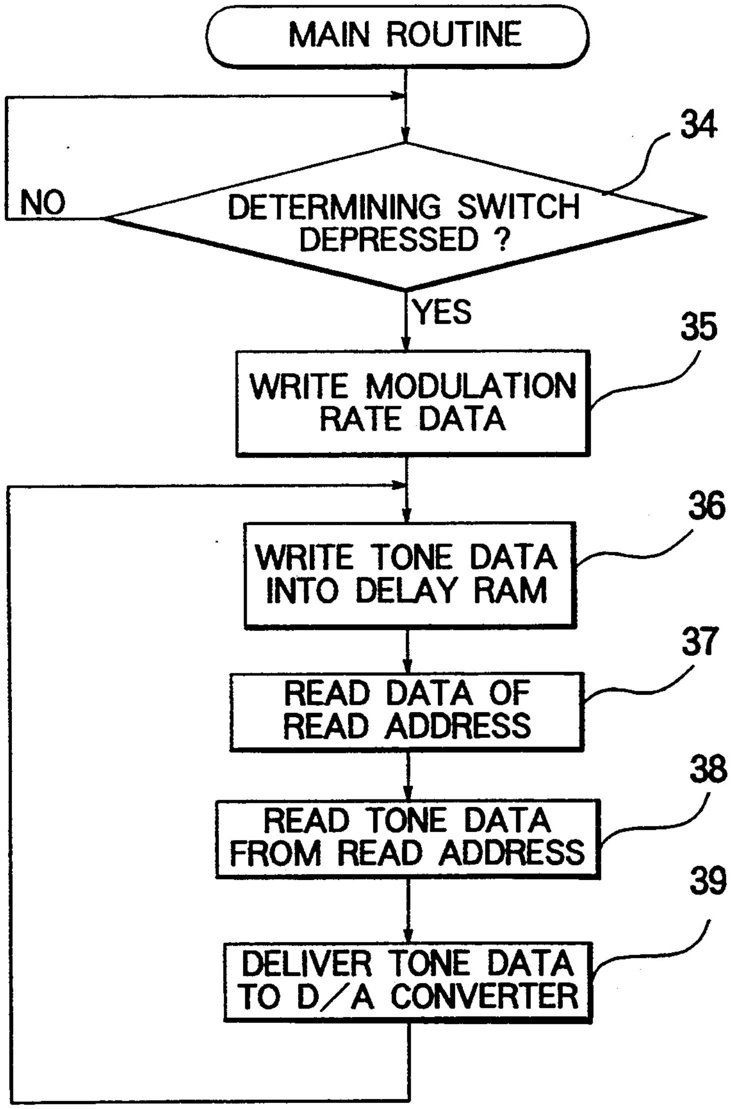
FIG. 4 is a flowchart of a main routine for controlling the operation of the sound effect-creating device according to the first embodiment.
Figure 5:
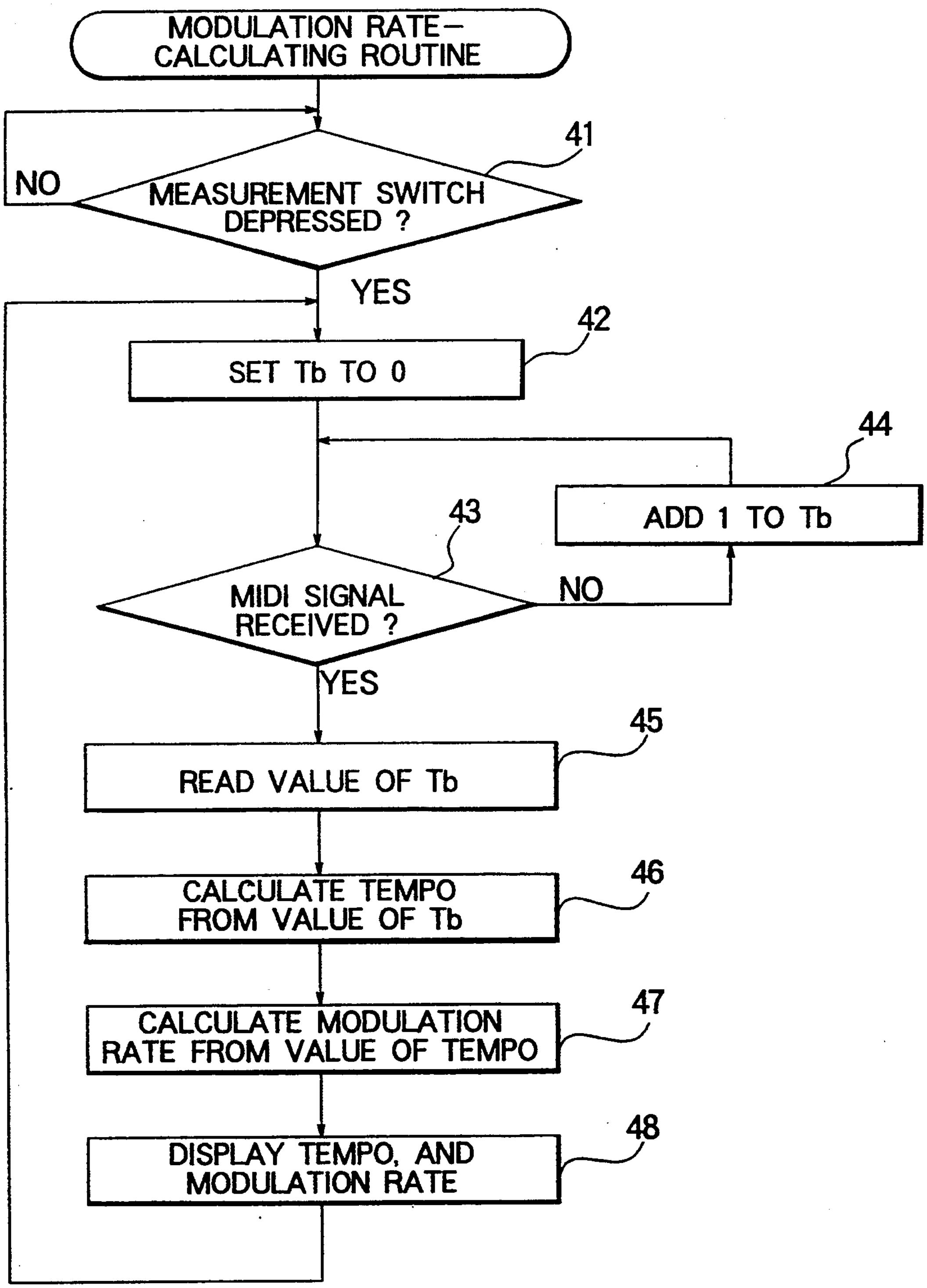
FIG. 5 is a flowchart of a modulation rate-calculating routine for calculating a modulation rate, which is executed by the sound effect-creating device according to the first embodiment.

The following steps 62 to 65 are identical to the steps 36 to 39 of the FIG. 4 main routine of the first embodiment, and description thereof is omitted.

Figure 9:
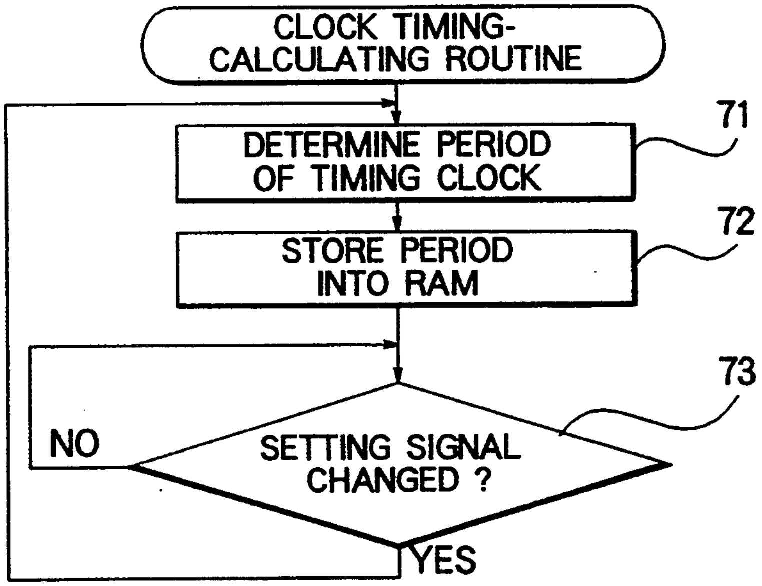
FIG. 9 is a flowchart of a routine for determining a period of a timing clock of a MIDI signal, which is executed by the sound effect-creating device according to the second embodiment.

Then, the calculation of the period of the timing clock of the MIDI signal will be described with reference to FIG. 9. First, the period of the timing clock is calculated at a step 71 from the tempo set as described above. The calculation is carried in the following manner: Since twenty-four timing clocks are generated per one quarter note, the period of the timing clock is calculated by dividing a time period corresponding to one quarter note which is determined by the tempo by a divisor of 24. For example, when the tempo is 120, the repetition period of the timing clock is equal to 20.8 msec. (=60 sec.÷120÷24).

The resulting quotient, i.e. the period of the timing clock is stored into the RAM 17 at a step 72. Then, the CPU 11 constantly checks for whether an ON/OFF signal from the switch 23 or 24 for setting the modulation rate/tempo is supplied from the switch interface 14 (step 73). When it is supplied, i.e., the modulation rate/tempo is changed, the program returns to the step 71.

Figure 10:
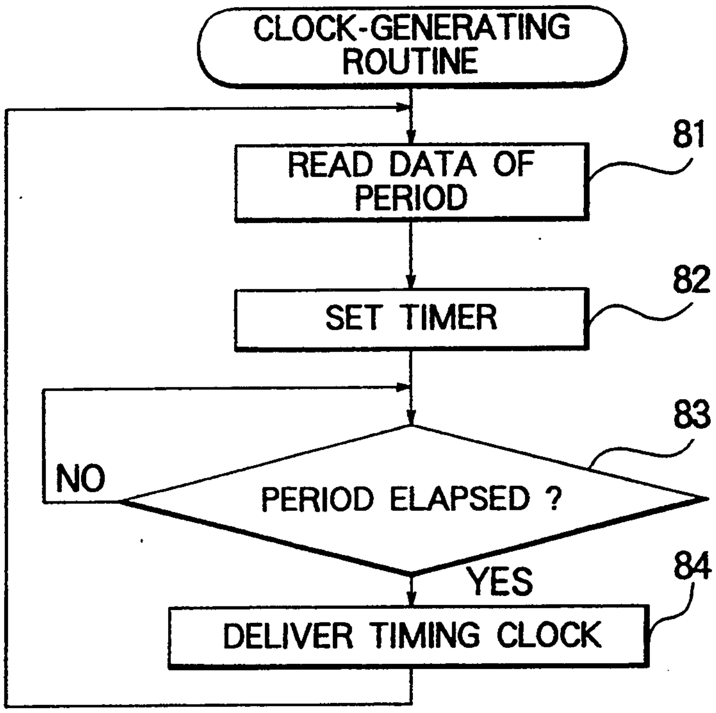
FIG. 10 is a flowchart of a clock generating routine for generating the timing clock of the MIDI signal, which is executed by the sound effect-creating device according to the second embodiment.

Next, a clock generating routine will be described with reference to FIG. 10. The CPU 11 reads data of the period of the timing clock from the RAM 17 at a step 81, and the period (one repetition period) is set to a timer, not shown, at a step 82. Then, the CPU 11 checks for the lapse of a time period equal to the period of the timing clock, whenever a predetermined very short time period elapses at a step 83. Each time the time period equal to the period of the timing clock elapses, the CPU 11 allows the timing clock (FSH) to be delivered from the MIDI block 18 to the electronic musical instrument at a step 84.

Figure 11:
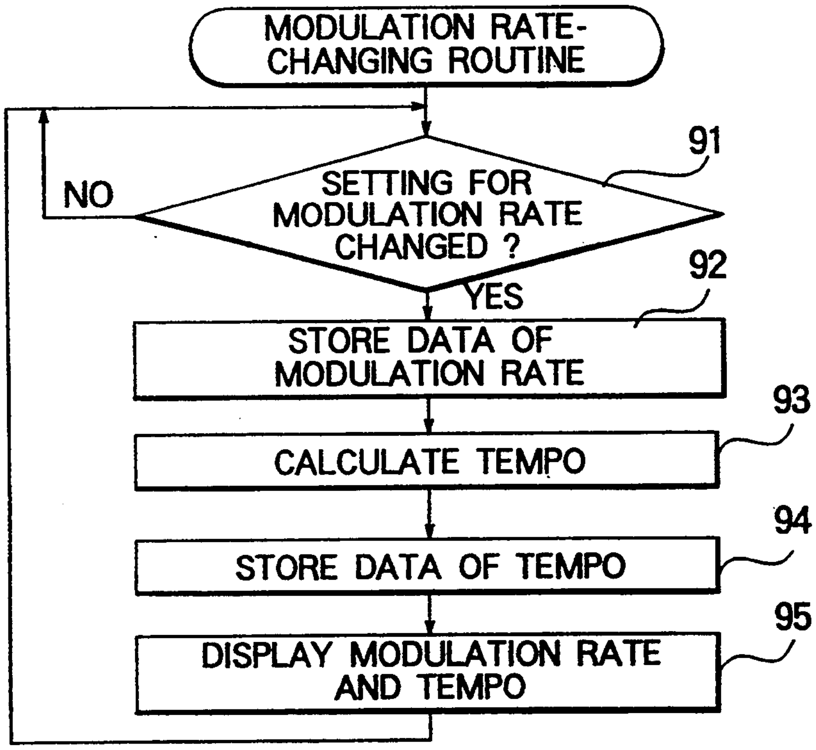
FIG. 11 is a flowchart of a modulation rate-changing routine for changing the modulation rate, which is executed by the sound effect-creating device according to the second embodiment.

Then, a modulation rate-changing routine will be described with reference to FIG. 11. According to this routine, the CPU 11 constantly checks for change of setting of the modulation rate at a steep 91. If the modulation rate is changed, new data of the modulation rate is stored into the RAM 17 at a step 92. Next, the tempo of the music is calculated based on the data of the modulation rate at a step 93. The data of the tempo is stored into the RAM 17 at a step 94.

The data of the tempo and the modulation rate determined as above are read from the RAM 17, and supplied via the display interface 15 to the display 2 to indicate them thereon at a step 95. Thereafter, the program returns to the step 91, for repeated execution of the modulation rate-changing routine.

As described heretofore, according to the present embodiment, it is possible to modulate the musical tone signal at a desired modulation frequency, by setting the modulation rate (and hence the modulation period) or the tempo, and further depending on the meter, if required, and at the same time allow the MIDI signal to be transmitted to the external electronic musical instrument at timing dependent on the tempo. Therefore, it is possible to make the modulation of the musical tone signal completely synchronous with the tempo of performance of the electronic musical instrument for accompaniment, which results in an excellent modulation effect (i.e. vibration effect) imparted to the performance.

Further, it is to be understood that the present invention is not limited to the preferred embodiments described above. For example, various changes and modifications may be made to details of the routines carried out by the sound effect-creating devices. Further, although in the second embodiment described above, the period of the timing clock is determined by calculation, this is not limitative but the period of the timing clock may be determined by retrieving a converting table for conversion from the modulation rate or tempo to the period of the timing clock.

Further, although the above embodiments describe the case of frequency modulation, this is not limitative, but the present invention may be applied to amplitude modulation of the musical tone signal, which may be carried out e.g. by reading data of amplitude from a RAM having the data of amplitude stored therein, and multiplying data of the digital signal of the musical tone by the data of amplitude.

Further, it goes without saying that if the variable "a" for determining the read address data is set to a large value, the performance or the musical tone is imparted with a delay effect. In addition, by providing a plurality of read addresses, from which data items are read out simultaneously, it is possible to impart such a modulation effect (or vibration effect) as will be obtained by modulating the musical tone signal by a plurality of modulating waves.

Further, if the tempo of the music is to be changed during the performance, data may be stored in the RAM in advance for automatically changing the tempo.

What is claimed is:

1. A sound effect-creating device for imparting a sound effect to a musical tone produced by performance, including modulation means for modulating an analog or digital signal indicative of said musical tone at a predetermined modulation frequency to thereby impart a predetermined modulation effect to said musical tone, said sound effect-creating device comprising:

MIDI signal-receiving means connected to an electronic musical instrument for receiving a MIDI signal therefrom;

clock period-calculating means for calculating a period of a timing clock of said MIDI signal received by said MIDI signal-receiving means; and modulation frequency-setting means for setting said predetermined modulation frequency based on said period of said timing clock of said MIDI signal calculated by said clock period-calculating means.

2. A sound effect-creating device according to claim 1, further including tempo determining means for determining a tempo of performance of said electronic musical instrument based on said period of said timing clock of said MIDI signal calculated by said clock period-calculating means, and wherein said modulation frequency-setting means sets said predetermined modulation frequency based on said tempo determined by said tempo determining means.

3. A sound effect-creating device according to claim 1, wherein said modulation frequency-setting means includes meter setting means for setting a parameter indicative of a meter of said musical tone, and sets said predetermined modulation frequency depending on said parameter indicative of said meter of said musical tone.

4. A sound effect-creating device according to claim 2, wherein said modulation frequency-setting means includes meter setting means for setting a parameter indicative of a meter of said musical tone, and sets said predetermined modulation frequency depending on said parameter indicative of said meter of said musical tone.

5. A sound effect-creating device for imparting a sound effect to a musical tone produced by performance, including modulation means for modulating an analog or digital signal indicative of said musical tone at a predetermined modulation frequency to thereby impart a predetermined modulation effect to said musical tone, said sound effect-creating device comprising:

modulation parameter-setting means for setting a modulation parameter for use in,setting said predetermined modulation frequency;

MIDI signal-delivering means for delivering a MIDI signal for control of an electronic musical instrument; and timing setting means for setting a period of a timing clock of said MIDI signal based on said modulation parameter set by said modulation parameter-setting means.

6. A sound effect-creating device according to claim 5, wherein said modulation parameter-setting means includes basic modulation frequency-setting means for setting, as said modulation parameter, a parameter indicative of a basic modulation frequency corresponding to a particular note for use in setting said predetermined modulation frequency, and said timing setting means sets said period of said timing clock of said MIDI signal based on said parameter indicative of said basic modulation frequency set by said basic modulation frequency-setting means.

7. A sound effect-creating device according to claim 5, wherein said modulation parameter-setting means includes tempo setting means for setting, as said modulation parameter, a tempo of performance of said musical tone, said tempo being in a predetermined relationship with a basic modulation frequency corresponding to a particular note for use in setting said predetermined modulation frequency, and said timing setting means sets said period of said timing clock of said MIDI signal based on said tempo set by said tempo setting means.

8. A sound effect-creating device according to claim 6, including meter-setting means for setting a parameter indicative of a meter of said musical tone, and modulation frequency-setting means for setting said predetermined modulation frequency based on said basic modulation frequency depending on said parameter indicative of said meter of said musical tone.

9. A sound effect-creating device according to claim 7, including meter-setting means for setting a parameter indicative of a meter of said musical tone, and modulation frequency-setting means for setting said predetermined modulation frequency based on said basic modulation frequency depending on said parameter indicative of said meter of said musical tone.

* * * * *